United States Patent
Jones

(10) Patent No.: US 8,175,540 B2
(45) Date of Patent: May 8, 2012

(54) INTERMODULATION DISTORTION CONTROL

(75) Inventor: Steven Robert Jones, Buckinghamshire (GB)

(73) Assignee: Ubinetics (VPT) Limited, Cambridge (GB)

( * ) Notice: Subject to any disclaimer, the term of this patent is extended or adjusted under 35 U.S.C. 154(b) by 942 days.

(21) Appl. No.: 12/013,111

(22) Filed: Jan. 11, 2008

(65) Prior Publication Data
US 2009/0181624 A1 Jul. 16, 2009

(51) Int. Cl.
*H04B 1/38* (2006.01)
(52) U.S. Cl. .......... 455/73; 455/102; 455/295; 455/296; 455/236.1; 375/353; 375/223; 375/237
(58) Field of Classification Search .............. 455/42, 455/73, 102, 127.1, 295, 236.1, 245.1, 264, 455/296; 375/353, 223, 237–239, 242
See application file for complete search history.

(56) References Cited

U.S. PATENT DOCUMENTS
2008/0039045 A1* 2/2008 Filipovic et al. .............. 455/295

OTHER PUBLICATIONS

Gray, S., et al., Intermodulation Distortion in IS-95 CDMA Handset Transceivers, Wireless Network Deployments, The Kluwer International Series in Engineering and Computer Science, 2002, vol. 558, Part II, pp. 99-127.

* cited by examiner

*Primary Examiner* — Tuan Pham
(74) *Attorney, Agent, or Firm* — Fitzpatrick, Cella, Harper & Scinto

(57) ABSTRACT

A wireless communications device comprising duplexing means for directing signals from a transmit path towards an antenna and for providing signals from the antenna to a receive path, wherein the transmit path is arranged to send a first signal to the duplexing means, the receive path is arranged to recover a second signal and the device further comprises detecting means for detecting the presence in the receive path of a third signal that will interact with the first signal to produce intermodulation distortion tending to hamper recovery of the second signal and control means responsive to the detecting means for enhancing linearity in the receive path to reduce said intermodulation distortion.

20 Claims, 3 Drawing Sheets

INTERMODULATION DISTORTION CONTROL

Figure 1:
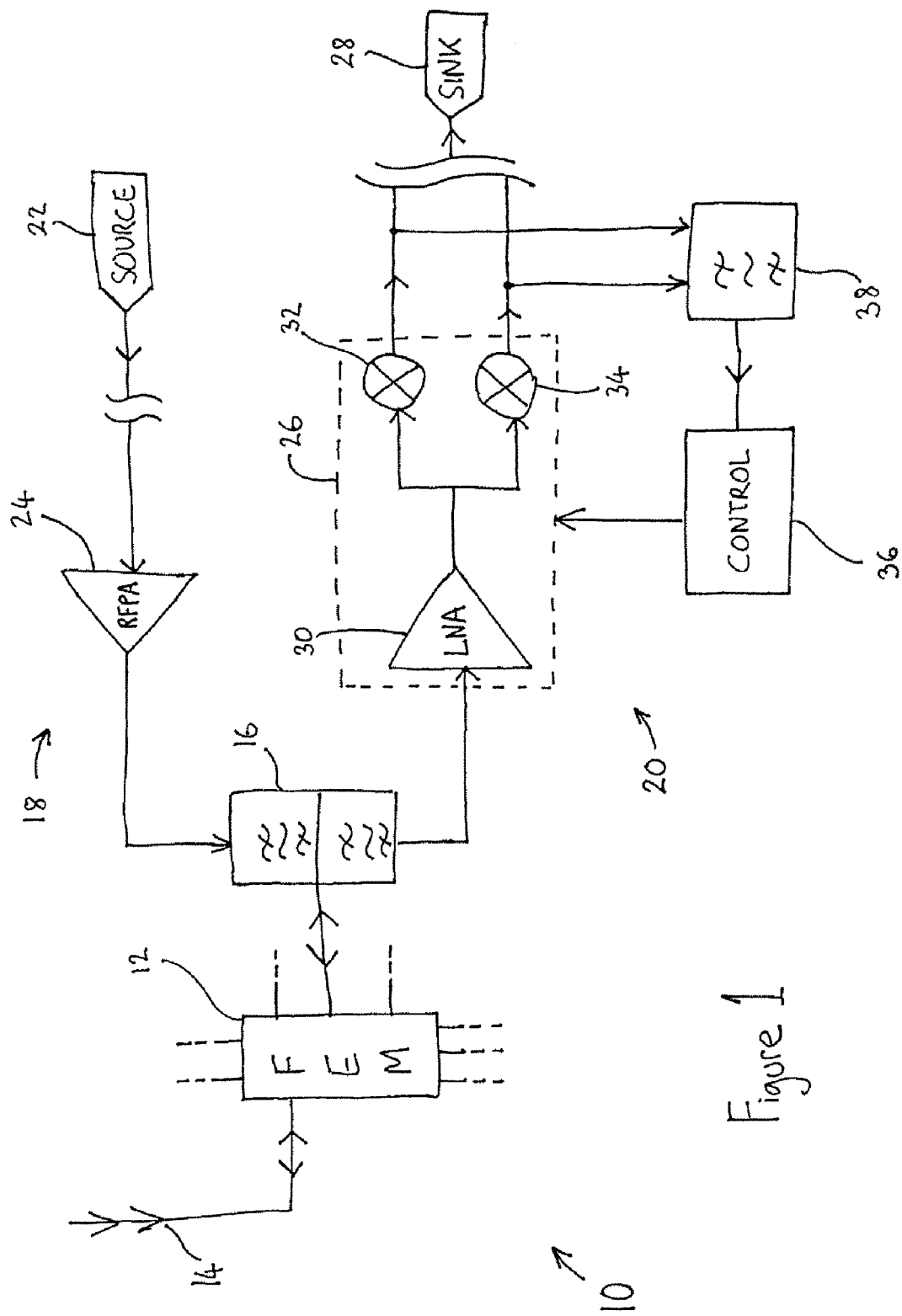

The invention relates to wireless communications. In particular, the invention provides methods of, and apparatus for, controlling intermodulation distortion (IMD) in the context of a radio system, such as a mobile telephone handset, that is configured to allow simultaneous transmission and reception.

In a Frequency Division Duplex (FDD) mobile telephone handset, hereinafter simply referred to as "a handset", that is configured to perform simultaneous transmission and reception on the same antenna, it is usual to provide a duplexer to allow the receiver and transmitter sections of the handset to share the antenna. Although the duplexer will be designed to resist transfer of signals between the transmitter and receiver sections of the handset, there is usually some level of leakage from the transmitter section to the receiver section through the duplexer. In certain circumstances, these leakage signals can interact with signal energy acquired by the antenna and lying outside the frequency profile of the wanted signal that is a target of the receiver section of the handset and lead to IMD that hampers recovery of the wanted signal in the receiver section. In the case of a PCS1900 handset, for example, a signal received at the antenna midway in frequency between the active forward link and reverse link channels can cause this type of IMD. In order to prevent the effects of such leakage hindering the operation of the receiver section, it is usual to include in the receiver section a surface acoustic wave (SAW) device for blocking the progress of the leakage signals within the receiver section of the handset.

According to one aspect, the present invention provides a wireless communications device comprising duplexing means for directing signals from a transmit path towards an antenna and for providing signals from the antenna to a receive path, wherein the transmit path is arranged to send a first signal to the duplexing means, the receive path is arranged to recover a second signal, transmit path signals may leak to the receive path through the duplexing means, and the device further comprises detecting means for detecting the presence in the receive path of a third signal that will interact with the first signal to produce intermodulation distortion tending to hamper recovery of the second signal and control means responsive to the detecting means for adjusting the receive path to reduce said intermodulation distortion.

The invention thus provides a way ameliorating the deleterious effects on wanted signal recovery of IMD arising from interaction of a transmit signal with a received signal outside the wanted band whilst avoiding the use of a SAW device. Accordingly, the bill of materials for a radio unit utilising the invention and the size of the radio device can both be reduced through the omission of a SAW device.

In certain embodiments, the detection means is arranged to seek the third signal at a frequency substantially mid way between the frequencies of the first and second signals.

In certain embodiments, the detecting means comprises a filter means for isolating the third signal. The filter means may be arranged to act on the output of a frequency down converter located in the receive path. The filter means may be a digital band pass filter.

The control means may be arranged to compare the size of the third signal, as isolated by the filter means, to a threshold in determining whether to adjust the receive path with the aim of IMD reduction or suppression. In certain embodiments, the control means is arranged to activate this adjustment process upon the size of the isolated signal exceeding a first threshold and is arranged to deactivate this adjustment process upon the size of the isolated signal falling below a second threshold which is lower than the first threshold.

The adjustment to the receive path for enhancing linearity could be, for example, a reduction in gain within the receive path or a power supply boost within the receive path.

In certain embodiments, the receive path comprises amplifying means and frequency down conversion means and a power supply boost is applied to both of these elements in order to enhance receive path linearity. In certain other embodiments, it suffices to supply the power supply boost to just one of these elements.

The wireless communications device may, for example, be a mobile telephone handset compliant with the PCS1900 standard.

The invention also consists in analogous methods of controlling the operation of wireless communications devices to reduce intermodulation distortion.

Figure 2:
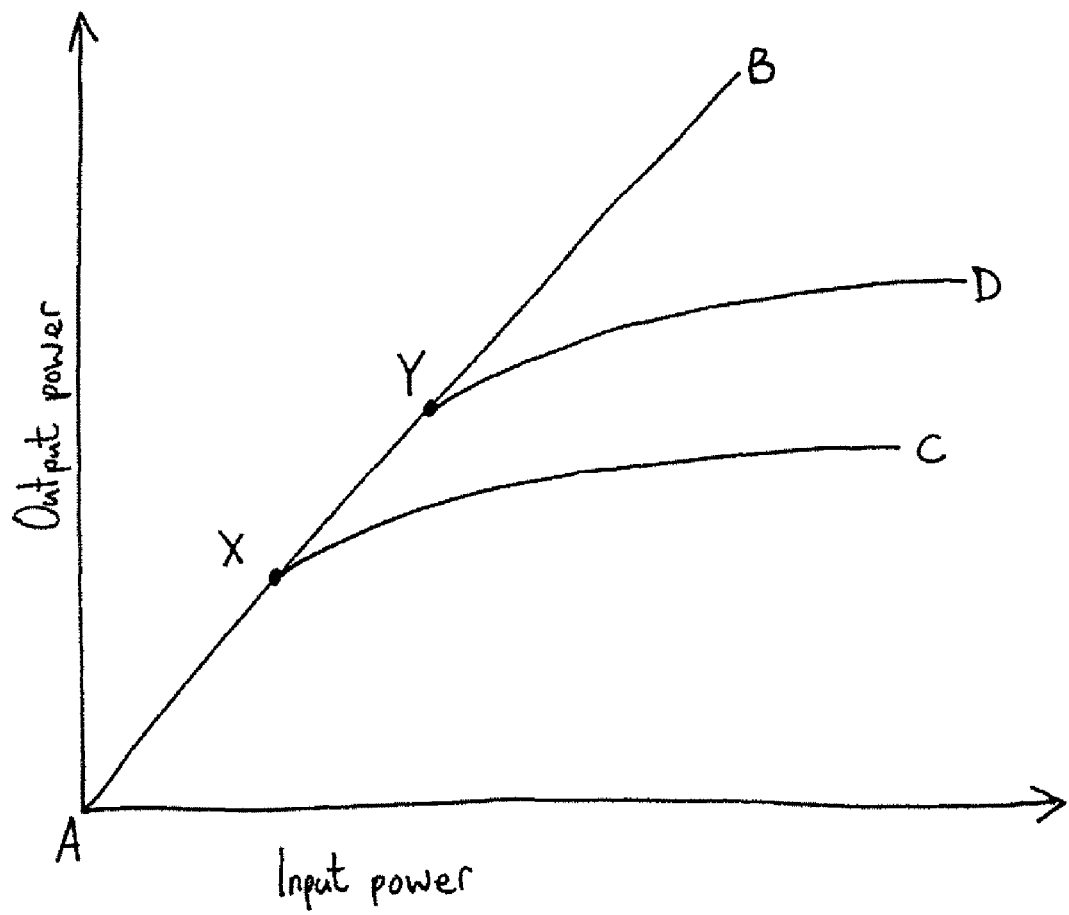

By way of example only, some embodiments of the invention will now be described in more detail with reference to the accompanying drawings, in which:

FIG. 1 schematically illustrates a mobile telephone handset capable of operating according to the PCS1900 standard;

FIG. 2 schematically illustrates manipulation of an input power to output power transfer characteristic for one embodiment of the invention.

Figure 3:
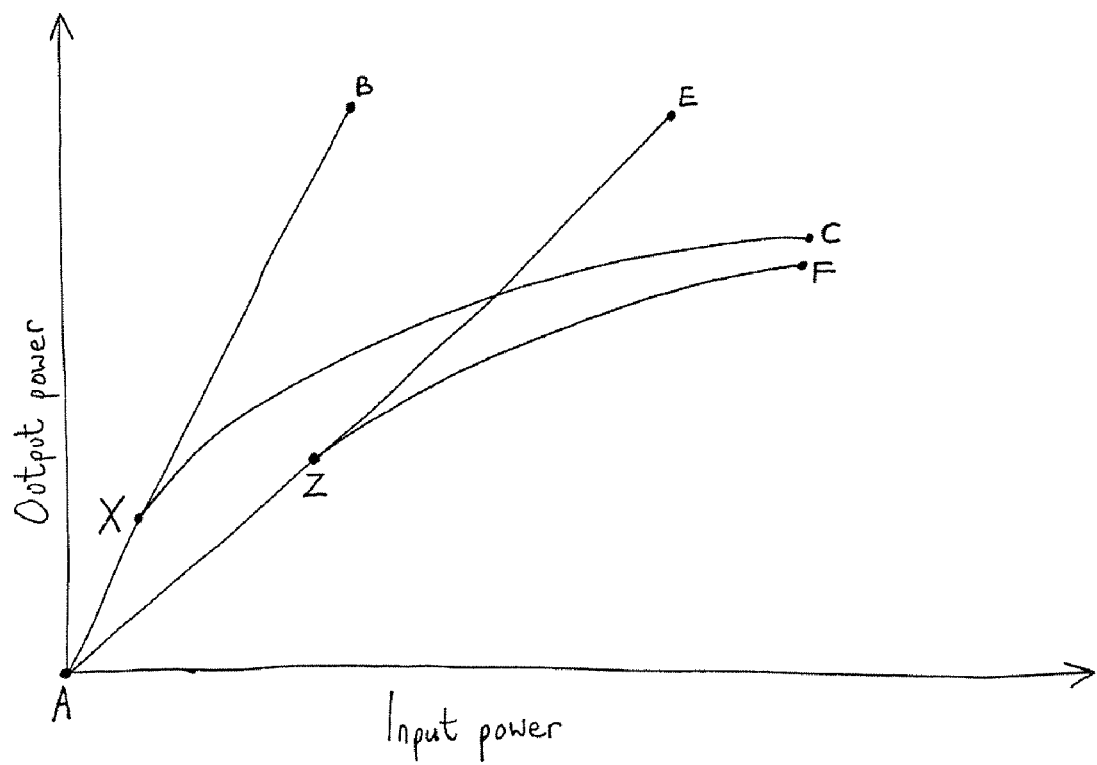

FIG. 3 schematically illustrates manipulation of an input power to output power transfer characteristic for another embodiment of the invention.

FIG. 1 shows a mobile telephone handset 10 that is designed to operate according to the PCS1900 standard. Only those elements of the handset 10 that are most closely concerned with a description of the present invention are shown in FIG. 1 and it will be apparent to the skilled person that a practical handset will comprise many other elements besides.

The handset 10 comprises a front end module (FEM) 12 which acts as a multi-way switch for connecting an antenna 14 with various subsystems within the handset 10. Just one of these subsystems is shown in FIG. 1 and that is a transceiver subsystem for conducting wireless communications according to the PCS1900 standard. The FEM 12 is connected to a duplexer 16 which in turn is connected to both a transmit path 18 and a receive path 20. The function of the duplexer is to allow simultaneous transfer of signals both from the transmit path 18 to the FEM 12 and from the FEM 12 to the receive path 20. Although the duplexer 16 is designed to resist the transfer of signals between the transmit path 18 and the receive path 20, in practice there will be some leakage of signals from the transmit path 18 to the receive path 20. As will become apparent shortly, the receive path is provided with an arrangement for suppressing undesirable effects of this leakage such that the traditional means for controlling such undesirable effects, i.e. a SAW filter, is not required.

The transmit path 18 and the receive path 20 are outlined only briefly in FIG. 1. As shown, the transmit path commences with an information source 22 (for example, digitised speech acquired via a microphone) and culminates with an RF power amplifier 24 which provides an input to the duplexer 16. It will be apparent to the skilled person that many processing operations are performed between source 22 and the RF power amplifier 24, such as Forward Error Correction coding, interleaving, carrier modulation, etc. However, the nature of these operations will be readily apparent to the skilled person and their description is not essential to a discussion of the present invention. The receive path 20 commences with an amplification and down conversion block 26, which receives signals from the duplexer 16, and culminates in an information sink 28 (such as an LCD display for rendering web pages). Of course, various processes are implemented in the receive path 20 between the block 26 and the information sink 28. The nature of such intervening processes (for example, deinterleaving, symbol demapping, etc.) will be readily apparent to the skilled person and shall not be described here since their description is not central to a discussion of the present invention.

The amplification and down conversion block 26 comprises a low noise amplifier (LNA) 30 and a pair of mixers 32 and 34. The LNA 30 amplifies signals received from the duplexer 16 and supplies them to mixers 32 and 34 which perform direct down conversion to baseband quadrature format, with the aid of a local oscillator signal (not shown). The quadrature baseband format signal is then subjected to further processing operations along the receive path 20 before arriving at the information sink 28. A feedback loop is provided for controlling an aspect of the behaviour of the amplification and down conversion block 26. The feedback loop comprises a control unit 36 and a band pass filter (BPF) 38.

In addition to being directed along the receive path 20 towards the information sink 28, the output of the amplification of down conversion block 26 is also sent to the band pass filter 38. The filtered version of this signal is then supplied to the control block 36 which measures the power in the filtered signal. The control block 36 uses this power value to control an aspect of the behaviour of the amplification and down conversion block 26, namely the size of the voltage of the power supply of the low noise amplifier 30 and the mixers 32 and 34. If the power value of the filtered signal produced by BPF 38 exceeds a first threshold, then the control unit 36 increases the voltage of the power supply of the low noise amplifier 30 and the mixers 32 and 34, thereby boosting the power used to drive the LNA 30 and the mixers 32 and 34. If the power of the filtered signal produced by BPF 38 falls below a second threshold, which is lower than the first threshold, then the control unit 36 deactivates this power boost. Therefore, there is a measure of hysteresis in the switching of this power boost.

When the aforementioned power boost is operating, then the LNA 30 and mixers 32 and 34 are less likely to produce significant IMD in the signals travelling along the receive path 20. Effectively, the power boost causes the compression point in the input power to output power characteristic of composite block 26 to move further from the origin, resulting an extension in the range of input power values over which the input power of block 26 has a linear relationship with the output power of block 26. The effect of the power boost is shown in FIG. 2, which illustrates, schematically, the input power to output power characteristic of block 26. Straight line A-B represents the ideal (i.e. linear) input power to output power characteristic for block 26, curve A-C shows the actual form of this characteristic in the absence of the power boost and curve A-D shows the actual form of this characteristic in the presence of this power boost. Curve A-C departs from the linear relationship at point X, which is its so-called compression point. It will be apparent that Y, the compression point of curve A-D, is more distant from the output power axis than compression point X, meaning that in the presence of the power supply boost significant IMD is less likely to occur because higher input signal power will occur relatively infrequently.

It is useful to review at this point some aspects of the PCS1900 standard. According to this standard, there is a handset transmit (HS TX) frequency band from 1850-1910 MHz and a handset receive (HS RX) frequency band from 1930-1990 MHz. Where the handset receives forward link signals at frequency F MHz in the HS RX band, then the handset must, according to the PCS1900 standard, be configured to transmit reverse link signals at frequency F-80 MHz in the HS TX band. In other words, the PCS1900 standard dictates that the forward link and reverse link signals are separated by 80 MHz in the frequency domain.

Consider now the case where the signals supplied to block 26 from the antenna 14 include, alongside an active forward link signal at F MHz, another signal at F-40 MHz or, in other words, mid way in frequency between the active forward and reverse link signals. The signal at F-40 MHz could, for example emanate from a basestation of another network operator's PCS1900 network. This signal at F-40 MHz intermodulates in block 26 with the corresponding reverse link signal at F-80 MHz that is leaking from the transmit path 18 to the receive path 20 to produce a co-channel interference signal at F MHz due to third order IMD. If the co-channel interference signal's power is more than approximately one third the size of the power of the forward link signal, then reception of the forward link signal becomes compromised and significant reduction in the sensitivity performance of the receive path 20 occurs.

It will be apparent that a signal at frequency F-40 MHz in the input to amplification and down conversion block 26 will be down converted to a frequency of 40 MHz in the quadrature format output of block 26. Accordingly, the BPF 38 is configured with its pass band centred on 40 MHz. Control block 36 periodically calculates the power in the 40 MHz signal provided by the BPF 38 and compares this power value with the two thresholds that were mentioned earlier to instruct the activation or deactivation of the power supply boost as necessary. The skilled person will understand that these thresholds are determined by experimentation e.g. by studying performance of a model of the handset in the design phase.

The handset 10 is configured such that the feedback loop containing the BPF 38 and the control block 36 is only active for short periods of time in order to conserve energy within the handset 10. For example, the feedback loop could be activated for a short period of time, say a few microseconds, at the start of each time slot of the forward link signal being recovered by the receive path 20 (these time slots are of the order of milliseconds in duration). The state, either active or inactive, to which the power boost is set at the end of a period of activation of the feedback loop would then persist until the next period of activation of the feedback loop.

Various modifications can be made to the embodiment described above without departing from the scope of the invention. Some such modifications shall now be described.

For example, the power supply boost could be applied to just the mixers 32 and 34 and not to the LNA 30 (or vice versa), provided that this is sufficient to ameliorate the IMD at baseband.

Depending on the chip technology that is used for the platform of the handset, it may be preferable to use a current boost rather than a voltage boost in order to provide the power supply boost aimed at enhancing linearity within the receive path.

In the foregoing embodiments, it has been discussed how receive path linearity enhancements can be obtained by power supply boosts in the receive path. It is possible, as an alternative or supplement to a power supply boost, to configure the control block 36 to instruct a reduction of the gain applied to signals traversing the amplification and down conversion block 26. That is to say, upon the power of the signal supplied by BPF 38 exceeding a threshold, a decrease in the gain of block 26 could be implemented, until such time as the control block 36 detects a suitable decrease in the power of the signal supplied by the BPF 38. The gain reduction could for example be implemented by reducing the gain of the LNA 30 under the control of block 36. By reducing the gain of block 26, there is an increase in the input signal power level at which the compression point is encountered, meaning that undesirable levels of IMD are less likely to occur whilst the gain reduction is in place. FIG. 3 illustrates, schematically, the effect of the gain reduction on the compression point.

In FIG. 3, straight line A-B, curve A-C and compression point X are carried over to describe the case where the gain reduction is inactive (FIG. 3 assumes, for the sake of clarity, that there is no power supply boost in play). Straight line A-E describes the ideal input power to output power characteristic of block 26 in the presence of the gain reduction and curve A-F, with its compression point at Z, describes the actual response of block 26 in the presence of the gain reduction. It will be apparent that point Z lies further from the output power axis than point X, signifying that IMD amongst the signal components traversing block 26 is less likely to occur to a significant extent in the presence of the gain reduction.

Although the foregoing embodiments have been described in the context of the PCS1900 standard, it will be understood that the invention is applicable to other standards besides. For example, the invention could be used in the context of the Band V region in the USA, where the HS RX band is 869-894 MHz and the HS TX band is 824-849 MHz with the active pair of transmit and receive channels being separated by 45 MHz.

The invention claimed is:

1. A wireless communications device comprising a duplexer for directing signals from a transmit path towards an antenna and for providing signals from the antenna to a receive path, wherein the transmit path is arranged to send a first signal to the duplexer, the receive path is arranged to recover a second signal and the device further comprises a detector for detecting the presence in the receive path of a third signal that will interact with the first signal to produce intermodulation distortion tending to hamper recovery of the second signal and a controller responsive to the detector for enhancing linearity in the receive path to reduce said intermodulation distortion, wherein the third signal's frequency is substantially half way between the frequencies of the first and second signals.

2. A device according to claim 1, wherein the controller is arranged to at least in part provide said linearity enhancement by reducing a gain applied in the receive path.

3. A device according to claim 1, wherein the controller is arranged to at least in part provide said linearity enhancement by boosting the power supply to the receive path.

4. A device according to claim 1, wherein the detector comprises a filter for isolating the third signal.

5. A device according to claim 4, wherein the controller is arranged to compare the size of the third signal, as isolated by the filter, to a threshold in determining whether to enhance receive path linearity.

6. A device according to claim 5, wherein the controller is arranged to activate the receive path linearity enhancement upon the size of the isolated signal exceeding a first threshold and is arranged to deactivate said enhancement upon the size of the isolated signal falling below a second threshold which is lower than the first threshold.

7. A device according to claim 1, wherein the receive path comprises a mixer to down convert in frequency signals travelling along the receive path and the controller is arranged to respond to the detector by boosting the power supplied to the mixer in order to at least in part provide the linearity enhancement.

8. A device according to claim 1, wherein the receive path comprises an amplifier for amplifying signals travelling along the receive path and the controller is arranged to respond to the detector by boosting the power supplied to the amplifier in order to at least in part provide the linearity enhancement.

9. A device according to claim 1, wherein the receive path comprises an amplifier for amplifying signals travelling along the receive path and the controller is arranged to respond to the detector by reducing the gain imparted by the amplifier in order to at least in part provide the linearity enhancement.

10. A device according to claim 1, wherein the receive path comprises a mixer to down convert in frequency signals travelling along the receive path and the controller is arranged to respond to the detector by reducing the gain imparted by the mixer in order to at least in part provide the linearity enhancement.

11. A method of controlling the operation of a wireless communications device, the device comprising a duplexer for directing signals from a transmit path towards an antenna and for providing signals from the antenna to a receive path, wherein the transmit path is arranged to send a first signal at a first frequency to the duplexer, the receive path is arranged to recover a second signal at a second frequency and the method comprises monitoring the receive path for the presence of a third signal that will interact with the first signal to produce intermodulation distortion tending to hamper recovery of the second signal and enhancing linearity in the receive path in response to detection of the third signal in order to reduce said intermodulation distortion, wherein the third signal's frequency is substantially half way between the first and second frequencies.

12. A method according to claim 11, wherein the step of enhancing linearity comprises reducing a gain applied in the receive path.

13. A method according to claim 11, wherein the step of enhancing linearity comprises boosting the power supply to the receive path.

14. A method according to claim 11, wherein monitoring the receive path comprises filtering signals on the receive path to isolate the third signal.

15. A method according to claim 14, wherein monitoring the receive path comprises comparing the size of third signal, as isolated by the filtering step, to a threshold in determining whether to enhance receive path linearity.

16. A method according to claim 15, wherein the receive path linearity enhancement is activated upon the size of the isolated signal exceeding a first threshold and is deactivated upon the size of the isolated signal falling below a second threshold which is lower than the first threshold.

17. A method according to claim 11, wherein enhancing the receive path linearity comprises boosting the power supplied to a mixer in the receive path that is used to down convert in frequency signals travelling along the receive path.

18. A method according to claim 11, wherein enhancing the receive path linearity comprises boosting the power supplied to an amplifier used to amplify signals travelling along the receive path.

19. A method according to claim 11, wherein enhancing receive path linearity comprises reducing the gain used by an amplifier used to amplify signals travelling along the receive path.

20. A method according to claim 11, wherein enhancing receive path linearity comprises reducing the gain imparted by a mixer used to down convert in frequency signals travelling along the receive path.

* * * * *